Oct. 12, 1965  B. N. CREAGER  3,210,808
FLEXIBLE MULLION

Filed Feb. 6, 1964  2 Sheets-Sheet 1

INVENTOR
Billy N. Creager

BY

ATTORNEY

Oct. 12, 1965    B. N. CREAGER    3,210,808
FLEXIBLE MULLION
Filed Feb. 6, 1964    2 Sheets-Sheet 2

INVENTOR
Billy N. Creager

BY

ATTORNEY

United States Patent Office 3,210,808
Patented Oct. 12, 1965

3,210,808
FLEXIBLE MULLION
Billy Neal Creager, 215 Comstock Place, Dallas, Tex.
Filed Feb. 6, 1964, Ser. No. 343,082
8 Claims. (Cl. 20—56.3)

This application is a continuation-in-part of my earlier filed co-pending application entitled "Flexible mullion joint," Serial No. 289,462, filed June 18, 1963.

The present invention relates to a window construction wherein two or more window units or panels are joined together to form multiple window units. More particularly, it relates to a window construction wherein the panels or windows can be joined together in a straight line to exist in a single flat plane, or can be joined together at a desired angle to form a bowed, curved window.

The principal object of the present invention is to provide a flexible mullion joint for joining window panels together which will allow the panels to exist in a straight line or a curved bow depending upon the desired window construction. To accomplish this, there is provided a universal joint for joining adjacent window panels to form either a flat window pane or a construction wherein adjacent panels form an angle with each other such as found in the bay window type of construction. The invention comprises two window frames for holding adjacent window panels wherein the two frames are relatively rotatable to enable one window panel to be positioned at an angle to the adjacent window panel. In one embodiment, the flexible mullion joint consists of three parts, which are two specially shaped identical window frames and a specially shaped joining mullion, which taken together constitutes a flexible mullion joint. In other embodiments, the flexible mullion joint consists of only two parts, all as will be explained in the following description.

Other objects, features and advantages will become apparent from the following detailed description when taken in conjunction with the appended claims and the attached drawing, wherein like reference numerals refer to like parts throughout the several figures, and in which:

Figure 1:
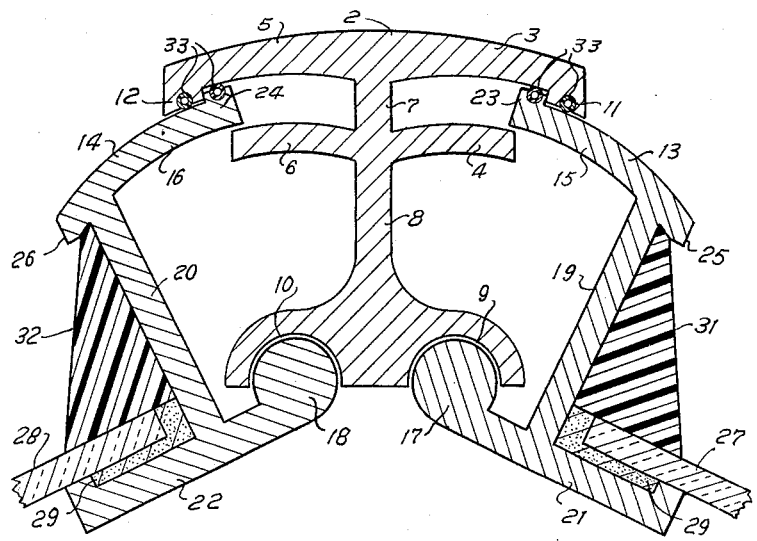
FIGURE 1 is a cross sectional view of one embodiment of the flexible mullion joint of this invention wherein adjacent window panels are positioned at an angle with each other.

Referring now to FIGURE 1, which is a sectional view of one embodiment of a flexible mullion joint of this invention, two window frames 13 and 14 for holding adjacent window panels 27 and 28, respectively, are rotatably attached to a connecting mullion 2. The mullion is generally T-shaped with double headed flanges 3 and 4 spaced apart and parallel to each other extending to one side, and double headed flanges 5 and 6 spaced apart and parallel to each other extending to the other side. The connecting mullion consists of a web portion 7 connecting the flanges, as shown, and a web portion 8 integral therewith extending away from the flanges to form a pair of symmetrical open sockets 9 and 10. As will be seen from the figure, the flexible mullion joint of this embodiment is symmetrical wherein the identical window frames 13 and 14 are slidably and rotatably attached to the connecting mullion 2.

The window frame 13 consists of a member 15 which is slidably engaged between the double headed flanges 3 and and 4, and similarly, window frame 14 consists of an identical member 16 slidably engaged between flanges 5 and 6. The window frames also consist of ball joints 17 and 18 which are rotatably engaged with open sockets 9 and 10, respectively, and are connected to members 13 and 14 by the flat webs 19 and 20, respectively. The double headed flanges of the connecting mullion and the members 13 and 14 are curved downward and form arcs drawn from the center points of the ball joints 17 and 18, so that the members 13 and 14 can slide in and out of the spaces provided by the double headed flanges. The members 15 and 16 are provided with shoulder portions 23 and 24, respectively, at their inner ends which project toward the flanges 3 and 5. Similarly, flanges 3 and 5 are provided with shoulder portions 11 and 12, respectively, at their outermost ends which project toward the members 15 and 16. When the frames 13 and 14 are rotated out to their maximum positions as shown in FIGURE 1, the corresponding shoulder portions act as stops to limit the maximum position of the window frame. The window frames and connecting mullion are elongated along an axis perpendicular to the plane of the drawing to accommodate the full length of the window panels 27 and 28, wherein the frames and connecting mullion are assembled by sliding the window frames into the mullion along an axis perpendicular to the plane of the drawing. The shoulder portions are each provided with recesses along the entire length of the connecting mullion and frames to accommodate plastic or other deformable members 33 to seal the flexible mullion against water or air seepage.

Figure 2:
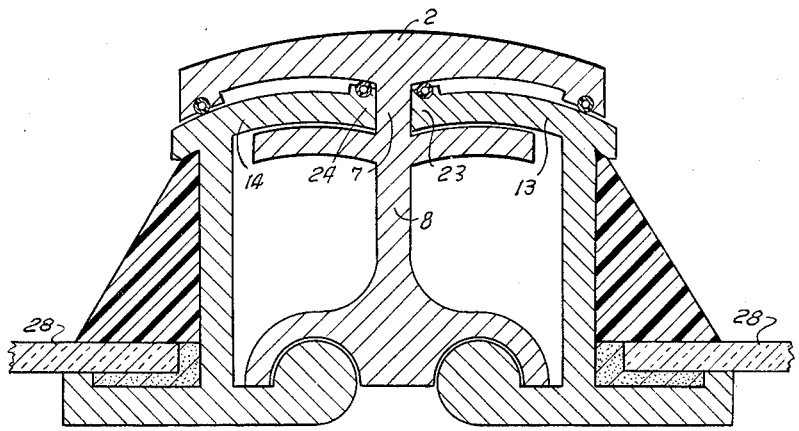
FIGURE 2 is the mullion joint of FIGURE 1 showing adjacent window panels aligned with each other in a single plane.

The window frames can also slide between the mullion flanges to a closed position as shown in FIGURE 2, wherein the window panels 27 and 28 are aligned in a single plane. The shoulders 23 and 24 come to rest, in this position, against the web portion 7.

Laterally extending flanges 21 and 22 are provided to the bottom ends of the flat web portions 19 and 20 of the window frames and opposing flanges 25 and 26 are provided to the top ends of the web portions 19 and 20. Window panels 27 and 28 are mounted adjacent the flanges 21 and 22, respectively, by any suitable means, such as a glazing compound or putty 29, for examples. Preferably, wedge-shaped shoes 31 and 32 are fitted between the flanges 25 and window panel 27 and flange 26 and window panel 28, respectively, to more adequately secure the panels.

From the foregoing description, it can be seen that the two adjacent window frames can be moved in relation to each other by sliding the topmost portions thereof between the opposing flanges of the connecting mullion about the rotating ball points 17 and 18. Thus a wide range of angles may be obtained, although for most purposes, it has been found that each frame rotating through an angle of about 25° from the straight aligned position is sufficient. In such case, which is not to be construed in a limiting sense, the frames could be aligned at 180° to each other, or rotated to about 130° to each other.

Figure 3:
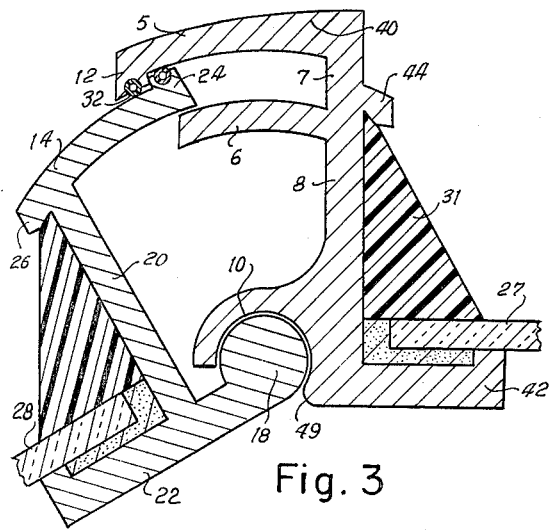
FIGURE 3 is a sectional view of another embodiment of the flexible mullion joint of this invention.

Another embodiment of a flexible mullion joint is shown in FIGURE 3, which is a non-symmetrical type, wherein one-half is identical to one-half of the mullion joint of FIGURE 1. The mullion joint comprises a first member 40 having a pair of parallel, downwardly curving flanges 5 and 6 corresponding to that of FIGURE 1 connected by a web portion 7 and an open socket 10 spaced therefrom by web portion 8. A second member 14 identical to the left window frame of FIGURE 1 is engaged with the member 40 as previously described. The member 40, in this embodiment, is provided with a downwardly projecting flange 44 corresponding to the flange 26 of window frame 14, and a laterally extending flange 42 spaced therefrfom by the web portion 8. A window panel 27 is mounted adjacent the lateral flange 42 as previously described, such as by the glazing compound 29 and wedge type shoe 31. It can be seen that the same effect is provided with the embodiment of FIGURE 3 as described with reference to FIGURE 1, but with a flexible mullion joint of simplicity of design. Here, the flexible mullion joint consists of only two parts, each of which acts as a window frame with the two parts being relatively rotatable. It will be noted that the bottom of the laterally extending flange 42 is below the bottom end of the web which defines the open socket 10, so that when the two sections 40 and 14 are in their closed position, the window panels 27 and 28 will be aligned. When the two sections are in their maximum open condition as shown in FIGURE 3, it will be noted that the bottom end of the web portion 8 adjacent the lateral flange 42 does not quite touch the ball joint 18, but rather a small gap or notch 49 is provided to permit rotation of the ball joint from its extreme positions. Similarly, the gap 49 will be present when the mullion joint is in its closed position. Again, the adjacent window panels can be positioned in alignment with each other to form a flat window, or the panels may be oriented at an angle with each other for the bay window type construction.

Figure 4:
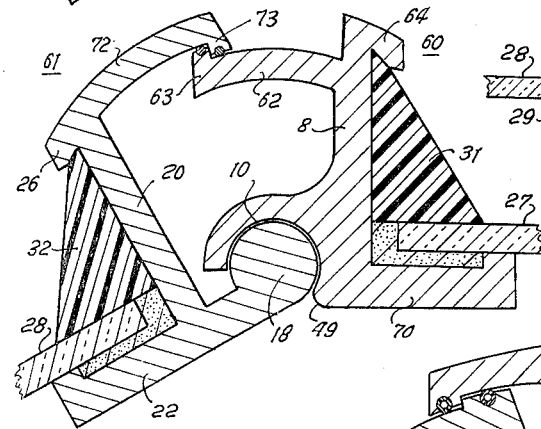
FIGURE 4 is a sectional view of yet another embodiment.

Another embodiment of a two part flexible mullion joint is shown in FIGURE 4, wherein two sections 60 and 61 each act as a window frame. The section 60 comprises a curved flange 62 having an upwardly flanged shoulder portion 63, and an open socket 10 spaced from the flange 62 by web portion 8. At the uppermost end of the web portion 8 is a downwardly extending flange 64 opposing a laterally extending flange 70 located adjacent the open socket. The other section 61 of the mullion joint comprises a curved flange 72 slidably engaged with the flange 62 of section 60 with a downwardly extending shoulder portion 73 at the end thereof for engaging the shoulder portion 63 of flange 62 in the maximum open condition. Again, the curvature of the flanges 62 and 72 are taken from the center point of the ball socket as previously described. A ball joint 18 is engaged in the open socket 10 and connected to the flange 72 by the flat web portion 20. Adjacent the ball socket is a laterally extending flange 22, and adjacent the curved flange 72 is an opposing flange 26 for mounting a window panel therebetween, all as previously described. Thus, in this embodiment, it is not necessary that the connecting mullion be provided with parallel flanges for slidably engaging the curved flange of the window frame. Rather, the connecting mullion is provided with a curved flange similar to the window frame previously described but inverted in relation therewith, such that when the two sections 60 and 61 are engaged in sliding relation, they cannot be separated.

Figure 5:
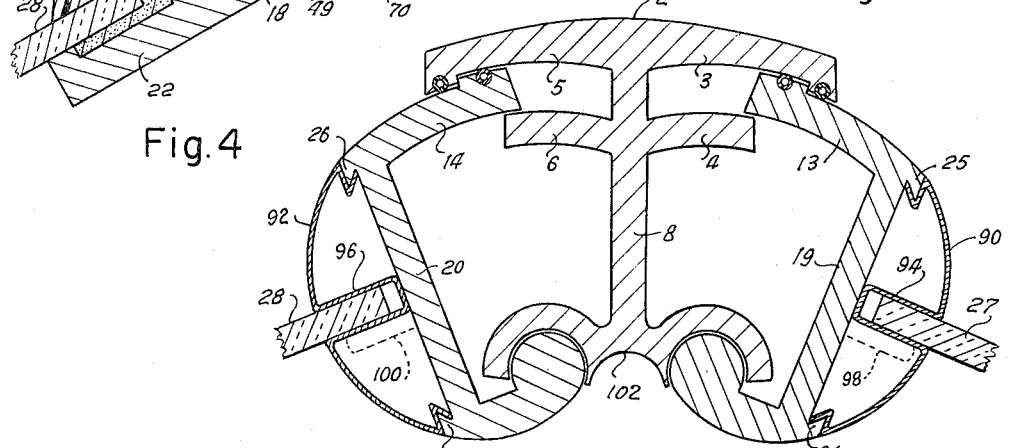
FIGURE 5 is a sectional view of the mullion joint shown in FIGURE 1 using an improved means for attaching the window panels to the window frames.

Referring to FIGURE 5, there is shown a flexible mullion joint having a similar construction as described with reference to FIGURE 1, but which is additionally provided with an improved means for attaching the window panels to the window frames. Instead of the laterally extending flanges 21 and 22 as shown in FIGURE 1, the bottom ends of the flat web portions 19 and 20 are provided with upwardly curving flanges 84 and 86, respectively, similar to flanges 25 and 26. Bowed members 90 and 92, preferably of plastic, are securely engaged between opposing flanges 25 and 84 of frame 13 and opposing flanges 26 and 86 of the other frame, respectively. The bowed members have recesses 94 and 96, respectively, for receiving the window panels 27 and 28. A glazing compound or other suitable substance is used to secure the window panels within the recesses. As shown in dotted lines, the window frames can additionally be provided with outwardly projecting flanges 98 and 100, if desired, to give additional support to the window panels when secured within the recesses. The bottom of the web portion 8 between the two open sockets is additionally provided with a recess 102, which is normally referred to as a "relief." The relief is provided since the mullion joint sections are preferably manufactured by a metal extrusion process, and by maintaining the thickness of the sections to a minimum, the extrusion process is simplified. Similar recess and indentations can be provided in the previously described embodiments, if necessary.

Figure 6:
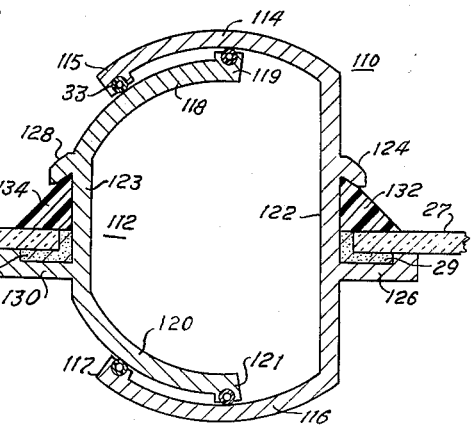
FIGURE 6 is yet another embodiment of a flexible mullion joint.

Referring to FIGURE 6, a further embodiment of a flexible mullion joint is shown that obviates the necessity of ball joints and sockets. A first window frame 110 comprises a first curved flange 114 with a downwardly projecting shoulder portion 115, and a second opposing curved flange 116 with an upwardly projecting shoulder portion 117, the two flanges being separated by a flat web portion 122. Extending laterally from the flat web portion 122 are opposing flanges 124 and 126 as previously described for securing a window panel 27. Another frame 112 comprises a first curved flange 118 with an upwardly projecting shoulder portion 119, and a second curved flange 120 with a downwardly projecting shoulder portion 121 spaced therefrom by a flat web portion 123.

Similarly, the flat web portion 123 is provided with outwardly extending flanges 128 and 130 for securing an adjacent window panel 28. The window frame section 112 is smaller in diameter than frame 110 and is fitted inside the latter along an axis perpendicular to the plane of the drawing for rotation about a common axis. Thus shoulder portion 119 rides along flanges 114, and shoulder portion 115 rides along flange 118 wherein the two shoulder portions act as stops when the panels are in their maximum open position. Similar considerations hold for the flanges on the bottom of the frames. It can be seen that a rotating action is achieved with the embodiment of FIGURE 6 similar to that previously described.

Figure 7:
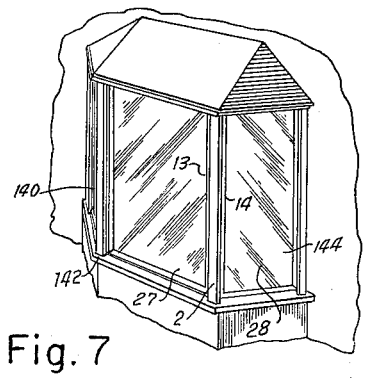
FIGURE 7 is a pictorial view of a bay window using the invention.

A pictorial view of a bay window construction is shown in FIGURE 7, wherein three window panels 140, 142 and 144 are joined by two of the flexible mullion joints of the invention using any of the embodiments previously described. The mullion joints are shown with reference numerals corresponding to those of FIGURE 1 for purposes of explanation only. As noted earlier, a flat window construction also can be made where all of the window panels are aligned.

Although the invention has been described with reference to a detailed description including several embodiments thereof, certain modifications and substitutions that do not depart from the true scope of the invention will occur to those skilled in the art, and it is intended that the scope of the invention be limited only as defined in the appended claims.

What is claimed is:
1. A flexible mullion joint comprising:
 (a) a first elongated member including a web portion having first and second spaced apart flange members extending from one side thereof;
 (b) said first flange member defining an outwardly facing, longitudinally extending groove substantially semicircular in cross section in the side thereof;
 (c) said second flange member being curved whereby the outer surface of said second flange member defines a segment of a cylinder having an axis substantially common with said groove;
 (d) a second elongated member including a web portion having third and fourth spaced apart flange members extending from one side thereof;
 (e) said third flange member being enlarged at its edge to define an enlarged portion substantially round in cross section;

(f) said fourth flange member being curved whereby the inner surface of said fourth flange member defines a segment of a cylinder having an axis substantially common to said enlarged portion; and (g) the inner surface of said fourth flange member being substantially parallel to and in opposing relation to the outer surface of said second flange member when said enlarged portion of said third flange member is received in the groove of said first flange member.

2. A flexible mullion joint as defined in claim 1 further including means for limiting the angular displacement of said first member relative to said second member as said enlarged portion of said third flange member turns in the groove of said first flange member.

3. A flexible mullion joint as defined in claim 2 further including a fifth flange member extending from the one side of said first elongated member, said second and fifth flange members defining a slot in which said fourth flange member moves.

4. A flexible mullion joint as defined in claim 1 further including an elongated deformable means extending longitudinally along said fourth flange member for sealing the space between said fourth flange member and said second flange member.

5. A flexible mullion joint comprising:
(a) a first elongated member including a web portion having first and second spaced apart flange members extending from one side thereof;
(b) said first flange member defining an outwardly facing, longitudinally extending groove substantially semicircular in cross section in the side thereof;
(c) said second flange member being curved whereby the inner surface of said second flange member defines a segment of a cylinder having an axis substantially common with said groove;
(d) a second elongated member including a web portion having third and fourth spaced apart flange members extending from one side thereof;
(e) said third flange member being enlarged at its edge to define an enlarged portion substantially round in cross section;
(f) said fourth flange member being curved whereby the outer surface of said fourth flange member defines a segment of a cylinder having an axis substantially common to said enlarged portion; and (g) the inner surface of said second flange member being substantially parallel to and in opposing relation to the outer surface of said fourth flange member when said enlarged portion of said third flange member is received in the groove of said first flange member.

6. A flexible mullion joint as defined in claim 5 further including means for limiting the angular displacement of said first member relative to said second member as said enlarged portion of said third flange member turns in the groove of said first flange member.

7. A flexible mullion joint as defined in claim 6 further including a fifth flange member extending from the one side of said first elongated member, said second and fifth flange members defining a slot in which said fourth flange member moves.

8. A flexible mullion joint as defined in claim 5 further including an elongated deformable means extending longitudinally along said fourth flange member for sealing the space between said fourth flange member and said second flange member.

References Cited by the Examiner

UNITED STATES PATENTS

| | | |
|---|---|---|
| 1,685,002 | 9/28 | Matranga. |
| 1,893,956 | 1/33 | Michaels _____ 189—78.2 |
| 1,895,572 | 1/33 | Kellogg _____ 16—128 X |
| 2,137,290 | 11/38 | Huckstep et al. _____ 20—40 |
| 2,144,515 | 1/39 | Trumpbour _____ 20—56.3 X |
| 2,365,378 | 12/44 | Benson _____ 16—178 X |
| 2,641,018 | 6/53 | Snyder _____ 16—178 |
| 2,658,233 | 11/53 | Kimmel _____ 16—178 X |
| 2,952,313 | 9/60 | Stroup _____ 16—128 X |
| 3,040,847 | 6/62 | Webster _____ 189—78 X |

FOREIGN PATENTS

| | | |
|---|---|---|
| 588,493 | 11/33 | Germany. |
| 601,840 | 8/34 | Germany. |
| 15,897 | 8/93 | Great Britain. |
| 443,930 | 3/36 | Great Britain. |
| 524,300 | 8/40 | Great Britain. |
| 862,027 | 3/61 | Great Britain. |
| 160,706 | 6/33 | Switzerland. |

HARRISON R. MOSELEY, *Primary Examiner.*